United States Patent [19]

Cohen et al.

[11] Patent Number: 4,743,517
[45] Date of Patent: May 10, 1988

[54] FUEL CELL POWER PLANT WITH INCREASED REACTANT PRESSURES

[75] Inventors: Ronald Cohen, West Hartford; Richard F. Buswell, Glastonbury, both of Conn.

[73] Assignee: International Fuel Cells Corporation, South Windsor, Conn.

[21] Appl. No.: 90,303

[22] Filed: Aug. 27, 1987

[51] Int. Cl.⁴ .................. H01M 8/06; H01M 8/04
[52] U.S. Cl. .................................. 429/17; 429/20
[58] Field of Search .......................... 429/17, 20

[56] References Cited

U.S. PATENT DOCUMENTS

| | | | |
|---|---|---|---|
| 3,972,731 | 8/1976 | Bloomfield et al. | 429/17 |
| 3,976,507 | 8/1976 | Bloomfield | 429/17 |
| 3,982,962 | 9/1976 | Bloomfield | 429/19 |
| 4,004,947 | 1/1977 | Bloomfield | 429/17 |
| 4,344,850 | 8/1982 | Grasso | 429/17 |
| 4,539,267 | 9/1985 | Sederquist | 429/17 |
| 4,574,112 | 3/1986 | Breault et al. | 429/26 |

FOREIGN PATENT DOCUMENTS 0158562  8/1985  Japan ........................ 429/17

Primary Examiner—Donald L. Walton
Attorney, Agent, or Firm—William W. Jones

[57] ABSTRACT

The fuel cell power plant operates at higher reactant pressures, and thus higher power density (lower cost) and efficiency, by providing reactant reformer steam from a separate steam boiler. Instead of supplying coolant steam to the reformer, the coolant is operated in a closed loop apart from the reformer, and the coolant steam is used to drive a steam generator to produce additional electricity. A portion of the raw fuel is burned within the steam boiler and the remainder is passed through the reformer and thence to the fuel cells. Boiler exhaust is used to drive a turocompressor which pressurizes the air used on the cathode side of the fuel cells.

15 Claims, 1 Drawing Sheet

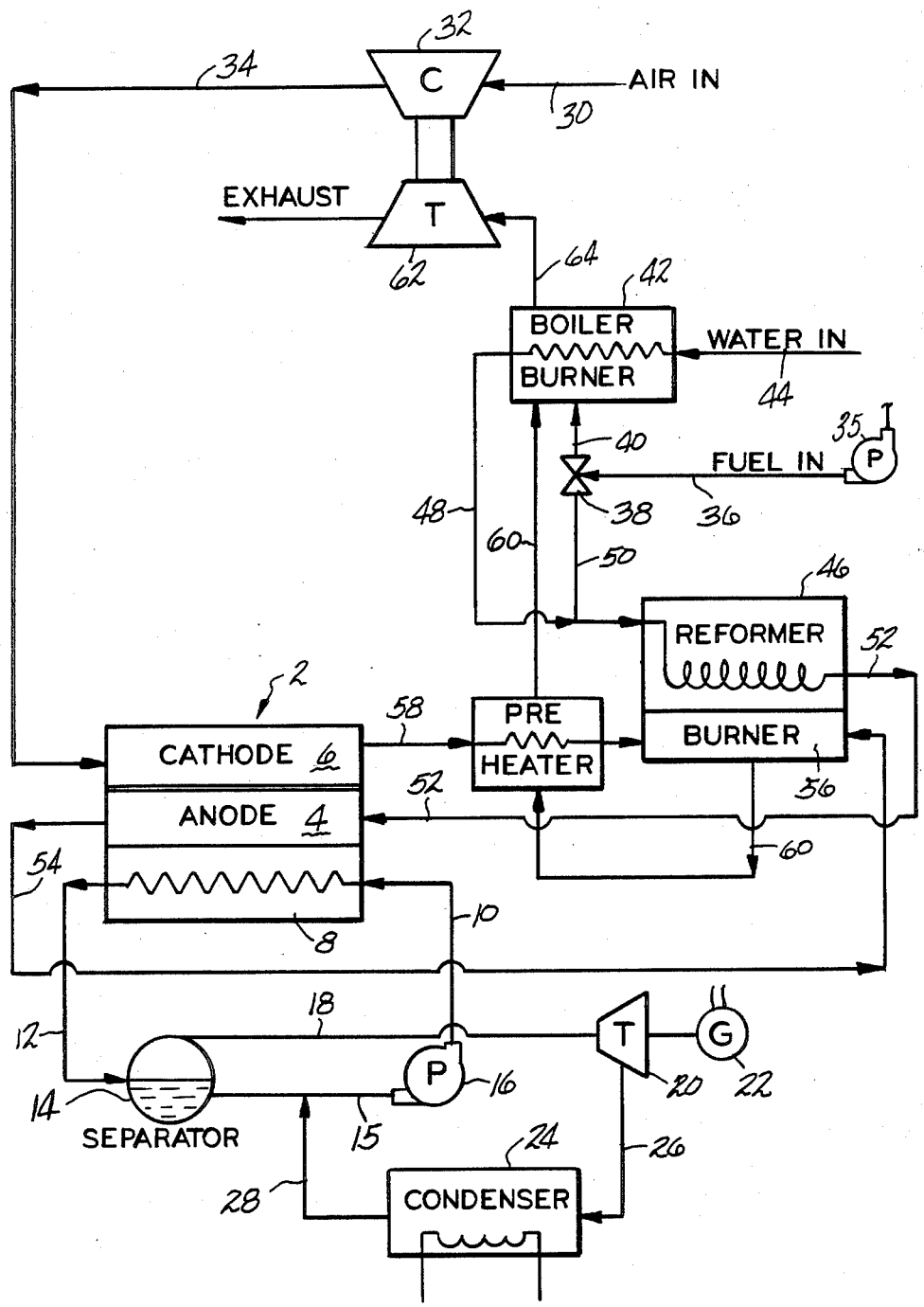

FUEL CELL POWER PLANT WITH INCREASED REACTANT PRESSURES

DESCRIPTION

1. Technical Field

This invention relates to pressurized fuel cell power plants, and more particularly, to acid fuel cell power plants which are operated at higher than normal reactant pressures without unduly elevating the operating temperatures of the cells.

2. Background Art

As a general rule, acid type fuel cell power systems will operate more efficiently and with increased power density (lower cost) in a pressurized environment. Elevated steam pressures are generated in the fuel cell stacks of the system by heating water to elevated temperatures in the cooling system. The steam pressure will thus be proportional to the cell stack temperature. In an acid fuel cell system, the elevated pressure on the cathode or oxygen side of the system will be created by compressing air fed into the system by means of a turbocompressor which is operated with waste heat from the power plant. On the fuel side, raw hydrocarbon fuel will be elevated in pressure by an electrically driven pump or compressor and fed into a catalytic reformer vessel where the fuel is mixed with the heated steam at an elevated pressure. The raw fuel is thus catalytically converted to a hydrogen enriched fuel gas suitable for use in the electrochemical reaction in the fuel cells. This enriched fuel is fed to the anode side of the fuel cell power section of the plant from the reformer. This catalytic reforming of the fuel gas and the electrochemical reactions in the fuel cells proceed more vigorously at higher pressures and temperatures. In order to ensure proper fluid flow in the system, the reactant pressures cannot be higher than the steam pressure.

In the prior art, the steam for the reformer has typically been provided by routing steam from the coolant, after the latter has cooled the cells, to the reformer. Such a system is shown in U.S. Pat. No. 3,982,962 Bloomfield, granted Sept. 28, 1976. When coolant steam is used in the reformer, the temperature and pressure of the steam in the reformer are limited by the operating temperatures of the cells in the power section which are being cooled by the coolant. In acid fuel cells, and particularly in phosphoric acid fuel cells, the material from which the cell components are made impose a maximum permissible operating temperature on the cells of about 450° F. If the operating temperatures of the cells exceed the maximum permissible operating temperatures, the cells will begin to fail. Acid fuel cell stacks are cooled by coolant passages which are interspersed throughout the stacks and which carry a coolant fluid, typically water. The coolant passages are preferably pipes which traverse the cell stack. These coolant pipes will typically be spaced apart in the stack so that each coolant pipe level will serve to cool about four or so cells on each side (above and below) the coolant pipe levels. A coolant system of this general type is disclosed in U.S. Pat. No. 4,574,112, Breault et al., granted Mar. 4, 1986. With this type of coolant system it will be appreciated that the coolant temperature will not reach the level of the temperature of the cells because the cooling is not performed one-on-one with the cells. For example, if one were to desire to operate the fuel gas reformer at a pressure of 450 psi to feed hydrogen-rich gas to fuel cell stacks operating at about 400 psi, the pressure in the coolant tubes in the power section of the stack would have to be greater than 450 psi. In order to produce this 450 psi coolant pressure, the temperature of the coolant steam would have to be greater than 460° F. in the coolant tubes. To achieve this 460° F. steam temperature in the coolant tubes, the cells would have to operate at temperatures greater than 500° F., which is above the maximum permissible extended operating cell temperature. It is thus apparent with the cooling and steam reforming systems of the prior art, one must not operate the fuel gas reformer at pressures in excess of about 175 psi, and that this pressure limit is the direct result of the maximum permissible power section fuel cell operating temperatures. This also places an upper limit of less than 175 psi on the operating pressure in the cells.

DISCLOSURE OF INVENTION

As previously noted, it is highly desirable to elevate the operating pressure of the fuel gas reformer and fuel cells to improve efficiency and power density. We have invented a fuel cell power plant system which can operate with an acid electrolyte, particularly phosphoric acid, wherein the fuel gas reformer and fuel cells can be operated at pressures in excess of 200 psi and as high as about 400 psi while the cell operating temperatures are maintained at safe levels of about 400° F. The benefits of our system include smaller, more efficient, less expensive reformers, fuel cells, heat exchangers, piping and controls, along with longer cell life. The power output of the system of our invention is equivalent to the prior art system per unit of operating fuel consumed, but the equipment size is smaller, improving cost per kilowatt of electricity produced.

In the system of this invention, the fuel cell power section is cooled by water recirculated in a closed loop which loop does not extend to the reformer in the system. The two phase water-steam mixture produced by cooling the power section with water is cycled to a steam separator where the steam fraction is separated from the water fraction. The water fraction is returned to the cooling passages in the power section. The separated steam fraction is fed to a steam turbine generator which is operated by the coolant steam to generate electricity. About 20% of the electricity generated by the system thus is derived from the coolant steam. The exhaust from the steam turbine passes through a condenser whereupon the water condensate is fed into the water recycled from the steam separator to the coolant passages. Steam for operating the reformer is produced by a boiler into which water is fed and boiled to produce steam. The boiler is fired partly by a fraction of the raw hydrocarbon fuel which is used to operate the fuel cells. Steam is produced by the boiler at a temperature of about 460° F. and is fed to the reformer which is operating at a pressure of about 450 psi. The raw hydrocarbon fuel not used to fire the boiler is fed into the reformer for conversion to a hydrogen-enriched fuel suitable for fueling the fuel cells. The reformer is heated by burning anode and cathode exhaust gases in a burner associated with the reformer to maintain the reformer operating temperature. The exhaust from the reformer burner is fed to the boiler to help fuel the latter along with the raw fuel diverted for that purpose. The burner exhaust from the steam boiler is used to drive a turbocompressor which compresses the air fed to the cathode side of the power section of the system.

It is therefore an object of this invention to provide a fuel cell power plant which can be operated at high reactant pressures for improved cost, size and efficiency.

It is a further object of this invention to provide a power plant of the character described which utilizes an acid electrolyte and wherein the cells can be operated at optimum temperatures.

It is another object of this invention to provide a power plant of the character described wherein reformer steam used to generate the reactant at higher pressures is produced by a steam boiler fired at least partially by raw fuel.

It is an additional object of this invention to provide a power plant of the character described wherein the power section is cooled by a recycling water coolant loop with coolant steam being used to drive a steam powered electricity generator.

It is yet another object of this invention to provide a power plant of the character described wherein the reformer steam system and the coolant steam system are completely separate from each other and operate independently of each other.

These and other objects and advantages of the invention will become more readily apparent from the following detailed description of a preferred embodiment thereof when taken in conjunction with the accompanying drawing.

BRIEF DESCRIPTION OF THE DRAWING

The drawing is a schematic representation of a power plant configured in accordance with the invention.

BEST MODE FOR CARRYING OUT THE INVENTION

Referring to the drawing, the electrochemical power section of the plant is denoted generally by the numeral 2, and includes an anode side 4, a cathode side 6 and a cooling portion 8. It will be appreciated that the power section 2 is actually a stack of rectangular fuel cells disposed one atop the other, with the anode side 4 being fueled with hydrogen rich fuel via a first manifold on one side of the stack with the anode exhaust gas being removed via a second manifold on the side of the stack opposite the first manifold. The cathode side is fed oxygen (air) in a direction transverse to the hydrogen gas flow via manifolds on the remaining two sides of the stack. Coolant water is admitted to the power section cooling portion 8 via inlet line 10 and the two-phase water-steam mixture formed as a result of the cooling operation leaves the cooling portion 8 through outlet line 12. The water-steam mixture is fed into a steam separator drum 14 wherein the water phase is separated from the steam phase. The water phase is returned to the inlet line 10 through line 15 by means of a pump 16. The steam phase leaves the separator 14 through a line 18 and is used to drive a turbine 20 which in turn operates a generator 22 to produce electricity. Exhaust from the turbine 20 passes to a condenser 24 through a line 26, and water condensed out of the turbine exhaust is returned to the coolant inlet 10 through lines 28 and 15. The temperature of the water in the line 10 is about 350° F., the temperature of the water-steam mixture in the line 12 is about 350° F., and the temperature of the steam in the line 18 is about 350° F. At these temperatures, the pressure in the cooling portion 8 is about 135 psi and the cells in the power section 2 will be operating at a maximum temperature of about 400° F. Air for the cathode side 6 enters the system through line 30 where it is compressed to a pressure of about 400 psi by compressor 32 and fed to the cathode side 6 through cathode inlet line 34. Raw hydrocarbon fuel which has been compressed to a pressure of about 400 psi by a pump 35 enters the system via line 36 where a control valve 38 diverts about 20% of the raw fuel into line 40 to be burned to fire a boiler 42 which produces high temperature, high pressure steam. Water from line 44 passes through the boiler 42 where it is converted to steam which is transported to a catalytic hydrocarbon fuel reformer 46 through line 48 and mixed with the raw hydrocarbon fuel in line 50 at the reformer inlet. The remaining 80% of the raw hydrocarbon fuel also is transported to the reformer 46 via line 50 from the valve 38. The steam in the line 48 and reformer 46 will be at a pressure of about 450 psi and a temperature of about 460° F. The reformed hydrogen-rich fuel gas moves from the reformer 46 through an outlet line 52 to the inlet side of the anode 4. Exhaust from the anode side 4 is emitted to an outlet line 54 whereby it is transported to a burner 56 associated with the reformer 46. Exhaust from the cathode side 6 is transported to the reformer burner 56 by means of cathode outlet line. The anode and cathode exhausts which contain hydrogen and oxygen are burned in the burner 56 to maintain the reformer operating temperature at about 1800° F. Exhaust from the burner 56 still containing some oxygen is transported to the boiler 42 by line 60 for admixture with the raw fuel from line 40 and burned. Exhaust from the boiler 42 is fed to a turbine 62 through line 64, the turbine 62 being operable to drive the air compressor 32.

It will be noted from the aforesaid description that the reformer, which is a conventional steam reformer, operates entirely independently of the power section coolant system. This invention thus enables one to operate the cell stack power section and coolant system at optimum pressures above 200 psi, and preferably at about 400 psi but with low temperatures of about 400° F. which will ensure longer component and electrolyte life for the power plant. At the same time, the reformer can be operated at optimum pressures of about 450 psi and temperatures of about 1800° F. so as to ensure optimum reforming of the fuel gas and extended catalyst life. These optimum conditions can be realized even though they would be mutually exclusive with the systems of the prior art which use coolant steam for the reforming process. Since a portion of the raw fuel is used to fuel the steam boiler, not all of the fuel consumed by the system will be used in the electrochemical production of electricity, thus the system will produce less electrochemical electricity per unit of fuel consumed than a prior art stack, however, the use of the coolant steam to drive the steam turbine electric generator provides additional electricity not electrochemically produced because of the fuel diversion. The total electrical power produced by the plant is thus equivalent per unit of fuel consumed, to that produced by a prior art conventional stack. A power system which embodies this invention can be made smaller and less expensively because increasing the system pressure improves cell performance and allows a reduction in the size of the fuel cells, fuel processing and thermal management reactors, piping and heat exchangers.

An example of improved performance with increasing pressure is the behavior of the fuel cell. In current pressurized systems, cell stacks operate at 120 psi. That is, the air on the cathodes and the hydrogen rich fuel gas on the anodes are at 120 psi. The water in the cooling tubes is at about 160 psi and 365° F. The cells operate at 200 amps per square foot (ASF) and a voltage of 0.75 volts. Therefore, each cell generates about 150 watts per square foot (WSF). Using the format of this invention, the system could operate with the reactant gases at 400 psi and the cells would generate a voltage of 0.82 volts at 200 ASF. This means the efficiency of the cells would be higher by 7 percentage points and the power density would be increased to 164 WSF. If only higher power density were desired, the cells could be operated at the same voltage (0.75 volts) but at much higher current density of 500 ASF. This would increase the power density to 375 WSF. If desired, an intermediate current density, between 200 ASF and 500 ASF could be picked as the operating point and a combination of higher efficiency and higher power densiity would result. As can be seen by these examples, significant improvements result with higher pressure operation made possible by this invention.

Since many changes and variations of the disclosed embodiment of the invention may be made without departing from the inventive concept, it is not intended to limit the invention otherwise than as required by the appended claims.

We claim:

1. A fuel cell power plant system comprising:
(a) a power section comprising a plurality of fuel cells forming a stack, each of said cells having an anode side and a cathode side;
(b) means for cooling said stack with a water coolant, said means for cooling including a water circulating loop and heat exchange means in said stack through which the water coolant flows, said water circulating loop including a steam separator for separating coolant steam from a steam-water mixture exhausted from said heat exchange means;
(c) a turbogenerator operated by steam from said steam separator for generating a portion of the electrical power produced by said power plant system;
(d) means for recirculating water from said steam separator back to said heat exchange means in said stack;
(e) reformer means for catalytically converting raw hydrocarbon fuel to a hydrogen rich fuel gas suitable for fueling the anode side of the fuel cells;
(f) boiler means for producing steam having a temperature of at least about 400° F.;
(g) means for transporting steam from said boiler means at a pressure greater than about 200 psi to said reformer means;
(h) means for admitting raw hydrocarbon fuel to said system, said means for admitting including duct means for transporting the raw hydrocarbon fuel to said reformer means for admixture with said steam from said boiler means prior to entering said reformer means;
(i) means for transferring hydrogen rich fuel gas from said reformer means to said anode side of said fuel cells at a pressure of at least about 200 psi; and
(j) means for supplying an oxidant gas at a pressure of at least about 200 psi to said cathode side of said fuel cells.

2. The fuel cell power plant system of claim 1 wherein said means for cooling said stack is operable to maintain said stack at an operating temperature of about 400° F.

3. The fuel cell power plant system of claim 1 wherein said fuel cells operate at a pressure of about 400 psi; said steam from said boiler means is at a pressure of about 450 psi; and said means for cooling said stack operates at a pressure of about 135 psi.

4. The fuel cell power plant system of claim 1 wherein said boiler means is fired with raw hydrocarbon fuel from said means for admitting.

5. The fuel cell power plant system of claim 1 wherein said means for supplying an oxidant gas comprises a turbocompressor operated by exhaust from said boiler means.

6. The fuel cell power plant system of claim 1 further comprising condenser means operable to condense water out of the exhaust from said turbogenerator, and means operable to return the condensed water from said condenser means to said means for recirculating water.

7. A fuel cell power plant system comprising:
(a) a power section comprising a plurality of fuel cells forming a stack, each of said cells having an anode side and a cathode side;
(b) means for cooling said stack to an operating temperature of about 400° F. with a water coolant, said means for cooling operating at an internal pressure of about 135 psi and including a water circulating loop comprising heat exchange means in said stack through which the water coolant flows, said water circulating loop also including a steam separator for separating coolant steam from a steam-water mixture exhausted from said heat exchange means, and means for recirculating water from said steam separator back to said heat exchange means;
(c) means for supplying an oxidant gas at pressures of about 400 psi to said cathode side of said cells;
(d) reformer means for catalytically converting raw hydrocarbon fuel to a hydrogen rich fuel gas suitable for fueling the anode side of the fuel cells;
(e) means for supplying a raw hydrocarbon fuel to said reformer means at pressures of about 400 psi;
(f) boiler means for producing steam at pressures of about 450 psi;
(g) means for delivering high pressure steam from said boiler means to said reformer means for admixing with said raw hydrocarbon fuel before entering said reformer means, said high pressure steam and said raw hydrocarbon fuel providing a mixture which is catalytically converted in said reformer means to a hydrogen rich fuel at a pressure of about 400 psi; and
(h) means for delivering said hydrogen rich fuel from said reformer means to said anode side of said fuel cells at a pressure of about 400 psi.

8. The fuel cell power plant system of claim 7 further comprising a turbogenerator operated by steam from said steam separator; and condenser means for condensing water out of exhaust from said turbogenerator, said condenser means being operably connected to said means for recirculating water whereby the condensed water is recirculated back to said heat exchange means.

9. The fuel cell power plant system of claim 7 wherein said boiler means is fired with raw hydrocarbon fuel from said means for supplying raw hydrocarbon fuel.

10. The fuel cell power plant system of claim 9 further comprising a turbocompressor means for compressing said oxidant gas, said turbocompressor means being run by exhaust from said boiler means.

11. A method of operating a fuel cell power plant, said method comprising the steps of:
 (a) providing an oxidant gas at pressure of at least 200 psi to an oxidizing portion of said fuel cell power plant;
 (b) providing a supply of raw hydrocarbon fuel pressurized to a pressure of at least 200 psi;
 (c) providing a supply of steam which is pressurized to a pressure greater than that of said raw hydrocarbon fuel;
 (d) mixing said raw hydrocarbon fuel and steam;
 (e) catalytically converting said fuel and steam mixture into a hydrogen rich fuel;
 (f) providing said hydrogen rich fuel at a pressure of at least 200 psi to a reducing portion of said fuel cell power plant; and
 (g) cooling said fuel cell power plant with a closed loop water coolant system operating at an internal pressure of less than 200 psi which loop is completely isolated from said raw hydrocarbon fuel and said hydrogen rich fuel.

12. A method of operating an acid fuel cell power plant, said method comprising the steps of:
 (a) providing air at a pressure of about 400 psi to a cathode portion of said fuel cell power plant;
 (b) providing a supply of raw hydrocarbon fuel pressurized to a pressure of about 400 psi;
 (c) providing a supply of steam which is pressurized to a pressure greater than about 400 psi;
 (d) mixing said raw hydrocarbon fuel and steam;
 (e) catalytically converting said fuel and steam mixture into a hydrogen rich fuel;
 (f) providing said hydrogen rich fuel at a pressure of about 400 psi to an anode portion of said fuel cell power plant; and
 (g) cooling said fuel cell power plant to an operating temperature of about 400° F. with a closed loop water coolant system operating at an internal pressure of about 135 psi, said closed loop being completely isolated from said raw hydrocarbon fuel and said hydrogen rich fuel.

13. The method of claim 12 including the step of separating steam from water in said closed loop, and using the separated steam to drive an electric turbogenerator to produce additional electrical output.

14. The method of claim 12 wherein said steam is supplied by boiling water in a boiler fired by a portion of said raw hydrocarbon fuel.

15. The method of claim 14 wherein said air is pressurized by a compresssor operated by exhaust from said boiler.

* * * * *